Figure 1:
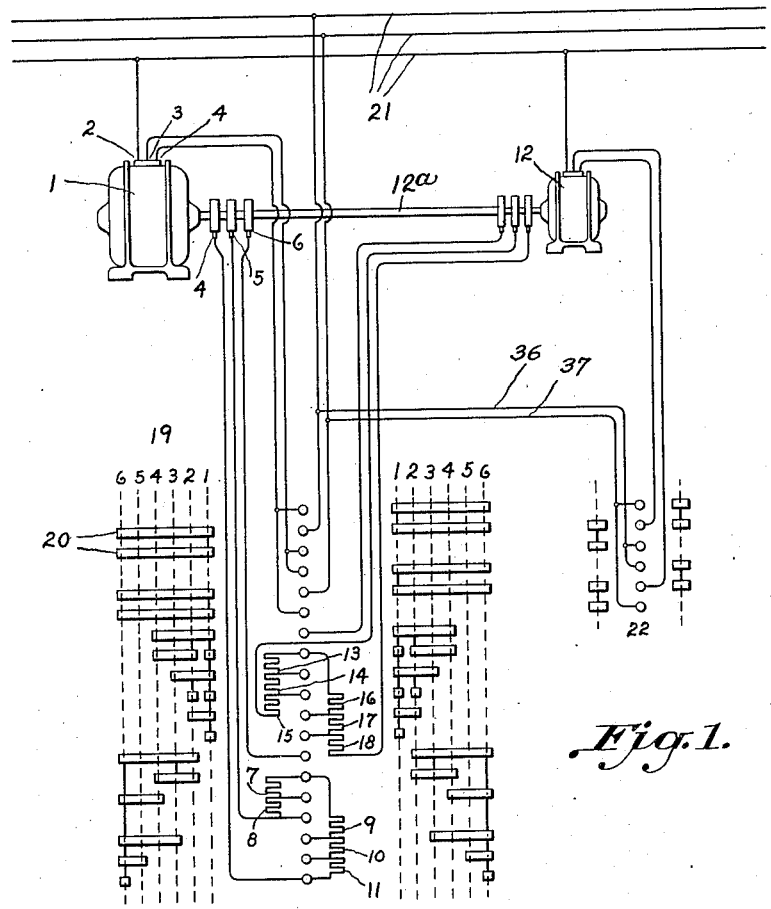

April 15, 1930.  C. SCHIEBELER  1,755,079
ELECTRIC MOTOR CONTROL FOR REVERSING OPERATIONS
Filed Jan. 30, 1928

Inventor:
Carl Schiebeler,
by Alexander S. ____
His Attorney.

Patented Apr. 15, 1930

1,755,079

UNITED STATES PATENT OFFICE

CARL SCHIEBELER, OF BERLIN, GERMANY, ASSIGNOR TO GENERAL ELECTRIC COMPANY, A CORPORATION OF NEW YORK

ELECTRIC-MOTOR CONTROL FOR REVERSING OPERATIONS

Application filed January 30, 1928, Serial No. 250,444, and in Germany February 25, 1927.

In the case of drives with three-phase asynchronous motors it is disagreeably noticeable that the speed of the motor increases above the synchronous speed upon the occurrence of negative moments at those drum positions at which resistance is inserted in the rotor circuit. Under these conditions the operator cannot effect a slowing down by switching back to the first drum positions, unless special reverse current braking positions are arranged in front of the power positions. Since these braking positions are usually ineffective on switching in the controller from the zero position, thus there results a large dead center position which may be undesirable in many cases. If, for example, in the case of a traversing gear or of the jib adjusting gear of a crane the load on coming to a stop is caused to swing, then the driver can bring this to a standstill by following this up by a short connection with the point of suspension of the load, that is to say, with the traversing gear or the jib head of the swinging load. In the event of these conditions of operation, however, a large dead center position is very inconvenient. Control devices are also known in the case of which a large dead center position is avoided by the feature that on switching back the drum from the last power position an automatic changing over of the driving motor is effected and the power positions are thus changed into reverse current positions. A disadvantage of this latter arrangement is that for diminishing phase short-circuits with simultaneous avoidance of a torque interruption in the driving motor as well as for varying the resistance connection with the changing over into reverse current, protective devices and other auxiliary means are required which make the control more complicated and expensive.

A particularly suitable solution of the mentioned problem is now reached according to the invention by the feature that on switching back the controller, a second motor with oppositely directed rotating field is switched in which acts as a brake motor for the driving motor. If for simplification this motor has a constant resistance, then the strengthening of the braking moment results solely by the weakening of the moment of force in the main motor. This arrangement suffices when the occurring negative moments are only small and is to be particularly recommended because then only a slight variation of the normal controller is necessary. If great negative moments occur, then the brake motor must also be regulated. In this case a controller for two rotor windings and adjusted for switching two three-phase motors running in parallel is used, the contact arrangement for the brake motor being reversed in such manner that the starting resistances of this motor are reduced on switching back. The switching in of the brake motor on the switching back of the controller is effected by well known means, for example, through an auxiliary drum suitably connected with the main drum as by means of a cam disc or pawl gear. The arrangement can be so made that the adjustment of this auxiliary drum takes place on switching back the main drum from the last position onto the last position but one; the change over can, however, also be effected at one of the last positions and some regulating positions be retained at which the main motor alone is switched in.

Figure 2:
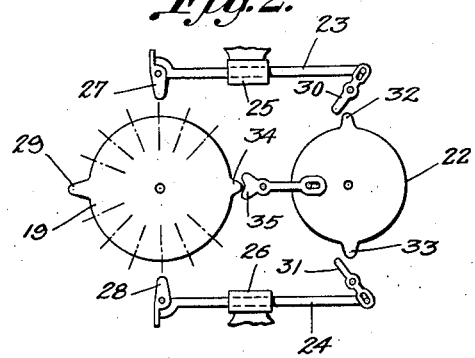

Fig. 1 of the drawing is a diagrammatic illustration of an electric motor system embodying the invention for carrying out reversing operations, while Fig. 2 is a plane view showing the operating connections between the controllers.

Referring to the drawing, the three-phase main driving motor 1 is provided with stator connections 2, 3 and 4 and with rotor connections 4, 5 and 6 to the latter of which is connected a starting resistance consisting of resistance sections 7–11 inclusive. An auxiliary brake motor 12 is provided. This motor is connected to the same load as the motor 1, and it may be connected directly to the motor 1, as by means of gearing. As shown the rotors of the two motors 1 and 12 are directly connected together by means of a shaft 12$^a$. This motor is also three-phase and is shown as being of the same type as the motor 1. Resistance sections 13–18 inclusive are connected in the rotor circuit of the motor 12.

The main driving motor is controlled by means of a rotary drum controller 19 which is provided on its lower part with contacts for controlling the resistance sections 7–11 inclusive in the rotor winding of the main motor, and on its upper part with contacts 20 for connecting the stator of the main motor to a source of supply 21 for forward or reverse operation depending upon the direction in which the controller is rotated. At the middle part of the controller, contacts are provided for controlling the resistance sections 13–18 inclusive in the rotor winding of the brake motor 12. As shown, this controller is provided with six operating positions in both forward and reverse directions of rotation. It will be noted, however, that the contact segments for the resistance sections 13—18 extend over but the first four positions in each direction of rotation, and it will be observed further that the resistance sections 13–18 inclusive are gradually cut out as the controller as moved back to the first position in which these resistance sections are substantially short-circuited.

The connection between the stator of the motor 12 and the supply source 21 is controlled by means of a drum controller 22 having two positions corresponding to forward and reverse rotation of the motor. This controller is operatively connected to controller 19 in a suitable manner, as by cam disc or pawl gear mechanism, so that assuming that both controllers are off position, the controller 19 can be moved to full speed position for either direction of rotation without operating the controller 22 but the connection is such that when the controller 19 is moved back toward off position to the position 4 the controller 22 will then be moved to connect the motor 12 for operation to produce a torque in opposition to the direction of rotation of the motor 19 whereby a braking force is applied.

As shown in Fig. 2 the operating connections between the controllers 19 and 22 may in one form comprise parallel slider bars 23 and 24 which are slidably mounted on opposite sides of the two controllers on supports 25 and 26. The ends of the bars 23 and 24 are provided adjacent the fourth running position of the controller 19 with pivoted pawls 27 and 28 and the controller 19 is provided with a projection 29 which is in position to engage the pawls 27 and 28 when the controller is turned. The pawl 27 is pivoted on the bar 23 so as to move freely on its pivot in one direction only so as to allow the projection 29 to pass by upon movement of the controller 19 in a clockwise direction, but upon the return movement of the controller through the fourth position the projection 29, by engagement with the pawl, moves the bar 23 toward the left. The pawl 28 functions in a similar manner to permit movement of the controller in a counterclockwise direction but upon return movement the bar 24 is moved toward the left.

The opposite ends of the bars 23 and 24 adjacent the controller 22 are connected through pin and slot connections with pivoted arms 30 and 31 respectively. These arms are so arranged as to cooperate with projections 32 and 33 respectively on the controller 22 upon movement to the left of the respective bar 23 or 24 whereby the controller 22 is turned either clockwise or counterclockwise, as the case may be, to one or the other of its two positions.

In order that the controller 22 will be returned to its "off" position as shown in the drawing when the controller 19 is moved back to its "off" position, also as shown in the drawing, the controller 19 is provided with a projection 34 which is diametrically opposite the projection 29 and arranged to cooperate with the forked end of a pivoted arm 35, the opposite end of which is connected through a pin and slot connection to the controller 22.

As thus arranged the controller 19 may be freely turned to full running position in either direction but upon movement of the controller back through the fourth position the bar 23 or 24, as the case may be, is moved to the left whereby the controller 22 is moved to a corresponding running position. The controller 22 remains in this position until the controller 19 is moved to the "off" position during which operation the projection 34 engages the arm 35 and thereby moves the controller 22 to the "off" position.

As the movement of the controller 19 is continued toward off position the resistance sections 13—18 are gradually cut out. When the controller 19 is moved to off position to disconnect the motor 1, the controller 22 will likewise be moved to off position through the agency of the connection between the two controllers, whereby the motor 12 is disconnected.

What I claim as new and desire to secure by Letters Patent of the United States is:

1. The combination with an alternating current driving motor, of a controller movable to accelerate said motor, an auxiliary motor connected to said driving motor, control means for said auxiliary motor, and an operating connection between said controller and said control means whereby said auxiliary motor is energized to apply a braking torque to said driving motor when the controller for said driving motor is moved from a running position back toward starting position.

2. The combination with a three-phase driving motor having a wound rotor, of a resistance for the rotor circuit of said motor, means for energizing said motor and for cutting out said resistance to accelerate said motor, an auxiliary three-phase motor connected to said driving motor, said auxiliary motor having a wound rotor, and means for energizing said auxiliary motor to apply a braking torque when the resistance in the rotor circuit of said driving motor is being re-inserted after said driving motor has been accelerated to a running position.

3. An alternating current motor drive for reversing operations comprising a main driving motor, a main controller therefor whereby said motor may be started and accelerated for either direction of rotation, an auxiliary motor connected to the same load as said main motor, a controller therefor driven with said main controller, a reversing controller for said auxiliary motor, and an operating connection between said main controller and said reversing controller whereby said auxiliary motor is energized to apply a braking torque when said main controller is moved from running position back toward off position.

4. The combination with two three-phase motors constituting a driving motor and a braking motor respectively provided with wound rotors, driving connection between said motors, resistances for the rotor circuits of said motors, control means for said driving motor whereby said motor can be energized and the resistance in its rotor circuit cut-out to accelerate said motor to running speed, control means for said auxiliary motor, and an operating connection between the control means for said motors whereby when the control means for said driving motor is moved back from a running position toward off position said auxiliary motor is energized to apply a braking torque and its rotor resistance subsequently cut out upon continued movement of said controllers.

5. The combination with a three-phase main driving motor having a wound rotor, of resistances in the rotor circuit of said motor, a main drum controller for connecting said motor for either direction of rotation and for cutting out said resistance to accelerate said motor, an auxiliary three-phase brake motor operatively connected to said main motor, said auxiliary motor having a wound rotor, resistances in the rotor circuit of said auxiliary motor, means operated by said main controller for gradually cutting out said resistances in the rotor circuit of said auxiliary motor when said main controller is moved back from forward position, switching means for connecting said auxiliary motor for each direction of rotation, and a driving connection between said main controller and said switching means whereby said auxiliary motor is energized to exert a braking torque when said main controller is moved back toward off position.

6. The combination with a main three-phase driving motor provided with a wound rotor, of resistances in the rotor circuit of said motor, an auxiliary three-phase motor provided with a wound rotor, a mechanical connection between said motors, a resistance in the rotor circuit of said auxiliary motor, switching means for connecting said main motor for forward or reverse operation and for varying the resistance in its rotor circuit to accelerate said main motor, a second switching means driven with said first switching means for varying the resistance in the rotor circuit of said auxiliary motor, said second switching means being arranged to decrease its resistance when the former is increasing its resistance, switching means for connecting said auxiliary motor for forward or reverse operation, and an operating connection between said latter switching means and said first switching means whereby said auxiliary motor is energized to apply a braking torque when said first switching means is being moved back toward off position.

In witness whereof I have hereunto set my hand this 12th day of January, 1928.

CARL SCHIEBELER.